United States Patent [19]

Pilger et al.

[11] Patent Number: 4,772,639
[45] Date of Patent: Sep. 20, 1988

[54] PROCESS FOR THE PRODUCTION OF MOLDED POLYURETHANE PARTS

[75] Inventors: Friedhelm Pilger, Cologne; Ulrich Knipp, Bergisch Gladbach; Reinhard Halpaap, Cologne, all of Fed. Rep. of Germany

[73] Assignee: Bayer Aktiengesellschaft, Bayerwerk, Fed. Rep. of Germany

[21] Appl. No.: 142,759

[22] Filed: Jan. 11, 1988

[30] Foreign Application Priority Data

Jan. 14, 1987 [DE] Fed. Rep. of Germany ....... 3700918
Jul. 23, 1987 [DE] Fed. Rep. of Germany ....... 3724377

[51] Int. Cl.$^4$ .............................................. C08G 18/70
[52] U.S. Cl. .................... 521/124; 521/126; 521/127; 521/160; 528/55; 528/58; 528/67
[58] Field of Search ............... 521/124, 126, 127, 160; 528/55, 58, 67

[56] References Cited

U.S. PATENT DOCUMENTS

| 4,025,466 | 5/1977 | Jourquin et al. | 260/2.5 |
|---|---|---|---|
| 4,150,206 | 4/1979 | Jourquin et al. | 521/51 |
| 4,256,841 | 3/1981 | Horacek et al. | 521/51 |
| 4,263,408 | 4/1981 | Meyborg et al. | 521/51 |
| 4,292,411 | 9/1981 | Jourquin et al. | 521/51 |
| 4,324,879 | 4/1982 | Bock et al. | 528/45 |
| 4,419,513 | 12/1983 | Breidenbach et al. | 544/222 |

FOREIGN PATENT DOCUMENTS 3527863  2/1987  Fed. Rep. of Germany .

Primary Examiner—Maurice J. Welsh
Attorney, Agent, or Firm—Gene Harsh; Joseph C. Gil; Thomas W. Roy

[57] ABSTRACT

The present invention is directed to a process for the production of light-resistant, optionally foamed elastomeric molded polyurethanes by reacting (a) organic polyisocyanates which are either mixtures of isophorone diisocyanate with polyisocyanates containing isocyanurate groups and based on 1,6-diisocyanatohexane or mixtures of IPDI with polyisocyanates containing isocyanurate groups and based on 1,6-diisocyanato-hexane and IPDI with organic compounds containing isocyanate-reactive groups in the presence of catalysts, wherein the components are reacted together inside closed molds in an isocyanate index of about 70 to 130.

The present invention is additionally directed to the elastomeric polyurethanes prepared by this process.

16 Claims, No Drawings

PROCESS FOR THE PRODUCTION OF MOLDED POLYURETHANE PARTS

BACKGROUND OF THE INVENTION

1. Field of the Invention

This invention relates to a new process for the production of light-resistant, optionally foamed, elastomeric molded polyurethanes by the reaction of organic polyisocyanates inside closed molds with compounds containing at least two isocyanate reactive groups in the presence of catalysts, wherein the polyisocyanates used are based on certain mixtures of selected polyisocyanates containing aliphatically or cycloaliphatically bound isocyanate groups.

2. Description of the Prior Art

The production of light-resistant elastic polyurethane foams from aliphatic and/or cycloaliphatic polyisocyanates is known, but it has previously been necessary to use very special catalyst combinations for the production of such foams because aliphatic and cycloaliphatic polyisocyanates are much less reactive than the aromatic polyisocyanates conventionally used for the production of polyurethane foams.

In DE-OS 3,008,811, for example, it is recommended to catalyze the reaction for the formation of polyurethanes by means of compounds containing primary or secondary amino groups in combination with an organic bismuth compound.

In DE-OS No. 2,447,067 and DE-OS No. 2,710,901, special combinations of certain amines, amidines or guanidines with alkaline earth metal salts and combinations of compounds containing primary or secondary amino groups with lead compounds are recommended.

The combination of alkali metal compounds and/or hexahydrotriazine derivatives with organic tin, zinc and/or iron(II) compounds is recommended in DE-OS No. 2,825,569.

Finally, DE-OS No. 2,832,253 recommends the use of alkali metal hydroxides and alkaline earth metal hydroxides in combination with organic tin, lead and iron compounds.

The process according to the invention described below discloses a new method of preparing light-resistant, elastic molded polyurethane parts in which polyisocyanates are reacted with components containing isocyanate reactive groups and auxiliary agents to give rise to high quality end products. The process according to the invention described in detail below is characterized by the use of mixtures of IPDI with polyisocyanates containing isocyanurate groups, in particular those based on 1,6-diisocyanatohexane, and in this respect it differs from the process described in the present Applicants' earlier German Patent Application No. P 3,527,863.3. The process according to the invention described below in particular results in molded products which have a pleasant, dry feel.

SUMMARY OF THE INVENTION

The present invention is directed to a process for the production of light-resistant, optionally formed elastomeric molded polyurethanes by reacting
(a) organic polyisocyanates with
(b) organic compounds which contain isocyanate reactive hydrogen atoms and which are at least difunctional in isocyanate addition reactions in the presence of
(c) catalysts for accelerating the isocyanate addition reaction, and optionally in the in the presence of
(d) auxiliary agents and additives the components being reacted together inside closed molds in proportions which maintain an isocyanate index of about 70 to 130, characterized in that the reactant used as polyisocyanate component (a) is based on
(a1) mixtures of
  (i) 1-isocyanato-3,3,5-trimethyl-5-isocyanatomethyl-cyclohexane (IPDI) and
  (ii) polyisocyanates containing isocyanurate groups and at most 0.5% by weight of unreacted diisocyanate, having an isocyanate content of about 15 to 25% by weight prepared by the trimerization of a portion of the isocyanate groups of 1,6-diisocyanatohexane in proportions by weight of (i):(ii) in the range of about 0.1:1 to 2.5:1 or
(a2) mixtures of
  (i) IPDI and
  (iii) polyisocyanates containing isocyanurate groups and at most 0.5% by weight of unreacted diisocyanate, having an isocyanate content of about 14 to 24% by weight and prepared by the trimerization of a portion of the isocyanate groups of a mixture of 1,6-diisocyanatohexane and IPDI in which the weight ratio of IPDI to HDI is up to 4:1,
the quantity of component (i) used being calculated to provide about 10 to 70% by weight of free IPDI in mixture a2), including any free IPDI still present in component (iii).

The present invention is also directed to the elastomeric polyurethanes produced by this process.

DETAILED DESCRIPTION OF THE INVENTION

Polyisocyanate component (a) used in the process according to the invention is based on mixtures (a1) or (a2) as described above. It is particularly preferred to use as polyisocyanate component (a) a mixture (a1) containing about 10 to 70% by weight, in particular about 35 to 65% by weight of IPDI. Component (ii) has preferably an NCO-$^{content}$ of from about 18 to 23% by weight.

Preparation of the individual component (ii) by the partial trimerization of 1,6-diisocyanatohexane may be carried out, for example, according to U.S. Pat. Ser. No. 4,324,879 (herein incorporated by reference) or according to EP-PS No. 10,589; preparation of component (iii) by the mixed trimerization of HDI and IPDI may be carried out, for example, according to DE-OS No. 3,033,860 or U S. Pat. No. 4,419,513, herein incorporated by reference. Preferably polyisocyanate component (a2) contains of from 35 to 65% by weight of free IPDI. For the manufacture of the trimers (iii) mixtures of HDI und IPDI are used in which up to 4 parts by weight of IPDI are present for each part by weight of HDI. Preferably the weight ratio HDI:IPDI is from 4:1 to 1:4. Component (iii) preferably contains from 17 to 22% by weight of isocyanate groups.

Component (b) is generally based on mixtures of (b1) relatively high molecular weight polyether polyols and (b2) low molecular weight chain lengthening agents or cross-linking agents.

Component (b1) includes polyether polyols in the molecular weight range of 500 to about 10,000, preferably about 2000 to 8000, containing two or three hydroxyl end groups or mixtures of polyether polyols in the above mentioned molecular weight range having an (average) hydroxyl functionality of 2 to 3. The polyether polyols are obtained in known manner by the alkoxylation of suitable starter molecules such as glycerol, trimethylol-propane, water, propylene glycol or ethylene glycol. When mixtures of difunctional and trifunctional polyether polyols having the hydroxyl functionality mentioned above are used, these mixtures may be prepared by the alkoxylation of a corresponding mixture of starting compounds or by mixing separately prepared polyether polyols. The alkoxylating agent used may be propylene oxide or ethylene oxide or mixtures of these two, but the polyether chains in the polyether polyols preferably contain at least about 50% by weight of propylene oxide units, provided that at the end of the alkoxylation reaction pure ethylene oxide is used in a quantity of at least about 5% by weight, preferably at least about 10% by weight, based on the total weight of all the alkylene oxides used in the reaction. The proportion of such ethylene oxide-tipped polyether polyols in component (b1) is preferably at least about 80% by weight, based on the total weight of component (b1). The exclusive use of ethylene oxide-tipped polyether polyols containing the above-mentioned proportion of terminal ethylene oxide units is preferred. Particularly preferred polyether polyols are those which have been obtained by the propoxylation of the starter molecules mentioned above as examples followed by ethoxylation of the propoxylation product, using a proportion by weight of propylene oxide:ethylene oxide in the range of about 50:50 to 95:5, preferably about 70:30 to 90:10.

The molecular weight of the polyether polyols may be calculated from the hydroxyl functionality and the hydroxyl group content.

Component (b2) is based on compounds with molecular weights below 500 which are difunctional and/or trifunctional in isocyanate addition reactions. Component (b2) preferably contains di- and/or tri-alkanolamines in which the amino groups are preferably exclusively secondary or tertiary amino groups, e.g. diethanolamine, triethanolamine, N-methyl-diethanolamine or corresponding compounds containing secondary hydroxyl groups such a diisopropanolamine, triisopropanolamine or N-methyl-diisopropanolamine, although these compounds with secondary hydroxyl groups are less preferred. Diethanolamine is particularly preferred. Mixtures of such di- and trialkanolamines may be used. In addition to these di- and/or tri-alkanolamines, alkanediols and/or triols which are free from nitrogen and optionally contain ether bridges may be used as chain lengthening agents or cross-linking agents. Mixtures of the di- and/or tri-alkanolamines exemplified above with such nitrogen-free polyols are therefore also suitable components (b2). In such mixtures the proportion of nitrogen-free polyols, based on the total weight of component (b2), is generally at the most 70% by weight. Examples of such nitrogen-free compounds include diols such as ethylene glycol, diethylene glycol, triethylene glycol, tetraethylene glycol, propylene glycol, dipropylene glycol, tripropylene glycol, tetrapropylene glycol, 1,2-, 1,4- and 2,3-dihydroxybutane, 1,6-dihydroxyhexane, commercial mixtures of octane diol isomers and any mixtures of such diols. In addition, triols such as glycerol or trimethylolpropane or the alkoxylation products or preferably propoxylation products of these triols, provided their molecular weight is below 500 are also suitable. It is also possible in principle although less preferred to use a component (b2) consisting exclusively of nitrogen-free polyols of the type exemplified above.

Component (b2) is used in the quantities required to provide about 3 to 50 parts by weight, preferably about 5 to 30 parts by weight of component (b2) per 100 parts by weight of component (b1) in the reaction mixture.

The catalysts (c) are organic tin and/or lead compounds, in particular dialkyl tin(IV) salts or lead(II) salts of carboxylic acids in which the alkyl groups attached to the tin atom contain from 1 to 4 carbon atoms and the hydrocarbon groups of the carboxylic acids (which are preferably aliphatic) preferably contain 7 to 11 carbon atoms. Examples of such lead and tin catalysts include dimethyl tin dilaurate, dimethyl tin dioctoate, dibutyl tin dilaurate, dibutyl tin dioctoate and lead-(II) octoate. The dimethyl tin compounds exemplified above are preferably used, in particular dimethyl tin dilaurate. It is also possible to use the amine catalysts with tertiary nitrogen atoms known from polyurethane chemistry or combinations of these amine catalysts with metal catalysts of the type exemplified above. Suitable amine catalysts include triethylenediamine and N,N-dimethylbenzylamine.

The catalysts are used in quantities of about 0.01 to 5 parts by weight, preferably about 0.2 to 2 parts by weight per 100 parts by weight of component (b1).

The optional auxiliary agents and additives (d) include (d1) blowing agents such as water: volatile organic substances such as acetone or ethyl acetate; and halogenated alkanes such as methylene chloride, chloroform, ethylidene chloride, vinylidene chloride, monofluorotrichloromethane, chlorodifluoromethane or dichlorodifluoromethane. The action of a blowing agent may also be obtained by the addition of compounds which decompose at temperatures above room temperature to release gases, e.g. nitrogen-releasing azo compounds such as azodicarbonamide or azoisobutyric acid nitrile. Further examples of blowing agents and details concerning the use of blowing agents may be found in Kunststoff-Handbuch, Volume VII, published by Vieweg and Hëchtlen, Carl-Hanser-Verlag, Munich 1966, e.g. on pages 108 and 109, 453 to 455 and 507 to 510. Further examples of auxiliary agents and additives include (d2) light stabilizers, e.g., piperidine derivatives, such as 4-benzoyloxy-2,2,6,6-tetramethylpiperidine, 4-benzoyloxy-1,2,2,6,6-pentamethylpiperidine, bis-(2,2,6,6-tetramethyl-4-piperidyl)-sebacate, bis-(2,2,6,6-tetramethyl-4-piperidyl)-suberate and bis-(2,2,6,6-tetramethyl-4-piperidyl)-dodecane dioate: benzophenone derivatives such as 2,4-dihydroxy-, 2-hydroxy-4-methoxy-, 2-hydroxy-4-octoxy-, 2-hydroxy-4-dodecyloxy- and 2,2,'-dihydroxy-4-dodecyloxy-benzophenone; benzotriazole derivatives such as 2-(2'-hydroxy-3',5'-di-tert.- amylphenyl)-benzotriazole oxalanilides such as 2-ethyl-2'-ethoxy- or 4-methyl-4'-methoxy-oxalanilide; salicylic acid phenyl esters and derivatives thereof such as phenyl salicylate, 4-tert.-butyl phenyl salicylate and 4-tert.-octylphenyl salicylate; cinnamic acid ester derivatives such as α-cyano-β-methyl-4-methoxy-cinnamic acid methyl ester, α-cyano-β-methyl-4-methoxy-cinnamic acid butyl ester, α-cyano-β-phenyl-cinnamic acid ethyl ester and α-cyano-β-phenyl-cinnamic acid isooctyl ester; or malonic ester derivatives such as 4-methoxy-benzylidene-malonic acid dimethyl ester, 4-methoxy-benzylidene-malonic acid diethylester and 4-butoxybenzylidene-malonic acid dimethylester. According to the present invention, the above-mentioned light stabilizers may be used singly or in combination. Mixtures of piperidine derivatives and benzotriazole derivatives are preferably used.

Additional examples of auxiliary agents and additives include (d3) surface-active additives (emulsifiers and foam stabilizers). Examples of suitable emulsifiers include the sodium salts of ricinoleic sulphonates and fatty acids or salts of fatty acids with amines such as oleic acid diethylamine or stearic acid diethanolamine. Alkali metal or ammonium salts of sulphonic acids such as dodecylbenzene sulphonic acid, fatty acids such as ricinoleic acid or polymeric fatty acids may also be used as surface active additives as well as ethoxylated nonylphenol.

The most suitable foam stabilizers are the polyether siloxanes, especially those which are water-soluble. These compounds are generally based on a copolymer of ethylene oxide and propylene oxide having a polydimethylsiloxane group attached thereto. Foam stabilizers of this kind are described, for example, in U.S. Pat. Nos. 2,834,748, 2,917,480 and 3,629,308. Polysiloxane-polyoxyalkylene copolymers branched through allophanate groups as described in DE-Offenlegungsschrift No. 2,558,523 are of particular interest.

According to the invention, the above-mentioned emulsifiers and stabilizers may be used singly or in any combination.

Other optional auxiliary agents and additives include cell regulators such as paraffins or fatty alcohols; pigments and dyes; flame retardants such as tris-chloroethylphosphate and ammonium phosphate and polyphosphate; fillers such as barium sulphate, kieselguhr, carbon black or whiting; and reinforcing fillers such as glass fibers. The known internal mold release agents may also be used in the process according to this invention.

Before the process according to the invention, components (b1) and (b2) are preferably mixed together to form a "polyol component" (b) which is then worked up with the polyisocyanate component (a) as a "one-shot system." Catalysts (c) and auxiliary agents and additives (d), if used, are incorporated with the above-mentioned reactants before the "polyol component" is mixed with the polyisocyanate component (a). Thus, for example, organic blowing agents and light stabilizers may be added to polyisocyanate component (a), while catalysts (c) and optionally other auxiliary agents and additives (d) may be added to the polyol component. The reactive mixture of the above-mentioned components is prepared at an isocyanate index (=NCO/H-active equivalent ratio $\times$ 100) of about 70 to 130, preferably about 75 to 110, with the aid of known mixing apparatus, for example, those used for reaction injection molding. Immediately after the reactive mixture has been prepared, it is introduced into closed molds (for example of steel or aluminum). The internal walls of these molds may be coated with the external mold release agents. The quantity of reaction mixture introduced into the mold and the quantity of blowing agent optionally used depend on the desired density of the molded product. If the mold is completely filled, the molded products obtained are solid and have a density of about 1.0 to 1.4 g/cm$^3$, depending on the nature and quantity of fillers used. If the mold is only partly filled and a blowing agent is used, the products obtained by the process according to the invention are microcellular (density range about 0.8 to 1.0 g/cm$^3$) or foamed (overall density about 0.1 to 0.8, preferably 0.3 to 0.7 g/cm$^3$) molded parts which have a compact surface or non-cellular outer skin.

The temperature of the mixture to be introduced into the mold is generally in the region of about 20° to 60° C., preferably about 20° to 50° C. In the process according to the invention, the temperature of the molds is maintained at about 40° to 90° C., preferably about 55° to 65° C. The molded products may generally be removed from the molds after a dwell time of about 3 to 10 minutes. The resulting elastomeric molded parts according to the invention have excellent mechanical properties and excellent resistance to light, in particular UV light. They are suitable, for example, for the manufacture of upholstery parts such as arm rests and seating surfaces used in the construction of furniture and the interior of motor vehicles, elastic handles for tools and operating elements, elastomeric surfaces, shock absorbent corners on furniture and bumpers or wear-resistant strips on motor vehicles.

The invention is further illustrated, but is not intended to be limited by the following examples in which all parts and percentages are by weight unless otherwise specified.

EXAMPLES

The following abbreviations are used in the examples:

Polyol I: a polyether polyol with an OH number of 27, prepared by the propoxylation of trimethylolpropane and ethoxylation of the propoxylation product (ratio by weight PO:EO=75:25).

Polyol II: a polyether polyol with an OH number of 28, prepared by the propoxylation of propylene glycol followed by ethoxylation of the propoxylation product (ratio by weight PO:EO=70:30).

Polyol III: a polyether polyol with an OH number of 35 prepared by the propoxylation of trimethylolpropane and ethoxylation of the propoxylation product (ratio by weight PO:EO=82.5:17.5).

EG: =ethylene glycol.

Stabilizer I: commercial polyether polysiloxane stabilizer ("Stabilizer DC 193" of Dow Corning).

Stabilizer II: bis-(2,2,6,6-tetramethyl-4-piperidyl)-sebacate.

Stabilizer III: 2-(2'-hydroxy-3', 5'-di-t-amyl-phenyl)benzotriazole.

Polyisocyanate I: isophorone diisocyanate; NCO=38%.

Polyisocyanate II: trimerized hexamethylene diisocyanate (monomeric HDI content less than 0.5%; NCO=21.5%).

To carry out Examples 1 to 9 summarized in the Table below, the starting materials indicated in the Table were first combined to form the corresponding polyol or polyisocyanate components and were then mixed together in a laboratory stirrer vessel in proportions to provide the isocyanate indexes indicated in the Table. Immediately after preparation of the reaction mixtures, which were at a temperature of about 25° C., the mixtures were introduced into aluminum molds measuring 20$\times$20$\times$1 cm which could be sealed and which were kept at a temperature of about 60° C. and coated on their internal walls with a commercial mold release agent (Acmosil P 180 of Acmos, Bremen). The quantity of reaction mixture introduced into the molds was calculated to produce molded products having a density of 0.4 g/cm³. The products were removed from the mold after a dwell time therein of 5 to 10 minutes. Light-resistant, foamed, elastomeric molded parts which had a non-cellular surface layer were obtained in each case. Only in Example IX was no blowing agent added. The formulation used in that example is suitable, for example, for the production of solid molded parts.

|  |  | Example No. | | | | | | | | |
|---|---|---|---|---|---|---|---|---|---|---|
|  |  | I | II | III | IV | V | VI | VII | VIII | IX |
| Polyol I | GT | 80 | 80 | 80 | 80 | 80 | 80 | — | — | 80 |
| Polyol II | GT | — | — | — | — | — | — | 80 | — | — |
| Polyol III | GT | — | — | — | — | — | — | — | 80 | — |
| EG | GT | 5 | 5 | 5 | 5 | 5 | — | 5 | 5 | 5 |
| Diethanolamine | GT | 5 | 5 | 5 | 5 | 5 | 10 | 5 | 5 | 5 |
| Dimethyl tin dilaurate | GT | 1 | — | 1 | 1 | 1 | 1 | 1 | 1 | 1 |
| Lead Octoate | GT | — | 2.2 | — | — | — | — | — | — | — |
| H₂O | GT | 0.3 | 0.3 | 0.3 | 0.3 | 0.3 | 0.3 | 0.3 | 0.3 | 0.3 |
| Stabilizer I | GT | 0.5 | 0.5 | 0.5 | 0.5 | 0.5 | 0.5 | 0.5 | 0.5 | 0.5 |
| Polyisocyanate I | GT | 24 | 24 | 19 | 28 | 13 | 22.5 | 28 | 29 | 28 |
| Polyisocyanate II | GT | 35 | 35 | 50 | 28 | 53.5 | 34 | 28 | 29 | 28 |
| Stabilizer II | GT | 0.5 | 0.5 | 0.5 | 0.5 | 0.5 | 0.5 | 0.5 | 0.5 | 0.5 |
| Stabilizer III | GT | 0.2 | 0.2 | 0.2 | 0.2 | 0.2 | 0.2 | 0.2 | 0.2 | 0.2 |
| Monofluorotrichloromethane | GT | 10 | 10 | 10 | 10 | 10 | 10 | 10 | 10 | — |
| Isocyanate Index |  | 105 | 105 | 105 | 105 | 105 | 105 | 105 | 105 | 105 |
| Gel/Cream time | s | 27/43 | 17/25 | 29/47 | 27/48 | 29/48 | 10/42 | 20/46 | 11/24 | 20 |

GT = parts by weight
s = seconds

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a light-resistant, optionally foamed elastomeric molded polyurethane which comprises reacting
   (a) an organic polyisocyanate component comprising
      (1) a mixture of
         (i) 1-isocyanato-3,3,5-trimethyl-5-isocyanatomethyl-cyclohexane (IPDI) and
         (ii) a polyisocyanate containing isocyanurate groups and at most 0.5% by weight of unreacted diisocyanate, having an isocyanate content of about 15 to 25% by weight and prepared by the trimerization of a portion of the isocyanate groups of 1,6-diisocyanatohexane in proportions by weight of (i):(ii) of about 0.1:1 to 2.5:1 or
      (2) a mixture comprising
         (i) IPDI and
         (iii) a polyisocyanate containing isocyanurate groups and at most 0.5% by weight of unreacted diisocyanate, having an isocyanate content of about 14 to 24% by weight and prepared by the trimerization of a portion of the isocyanate groups of a mixture of 1,6-diisocyanatohexane and IPDI in which the weight ratio of IPDI to HDI is up to 4:1, the quantity of component (i) being calculated so that the mixture (a2) contains about 10 to 70% by weight of IPDI, including any IPDI still present in component (iii) with
   (b) an organic compound which contains isocyanate reactive hydrogen atoms and is at least difunctional in isocyanate addition reactions in the presence of
   (c) a catalyst which accelerates the isocyanate addition reaction, the reactants being reacted together inside a closed mold in proportions which are suitable to provide an isocyanate index of about 70 to 130.

2. The process of claim 1 wherein mixture (a1) is present and has an IPDI content of about 35 to 65% by weight, based on the total weight of component (a).

3. The process of claim 1 wherein component (b) comprises a mixture of (1) a polyether polyol having a molecular weight of 500 to 10,000 and a hydroxyl functionality of 2 or 3 or mixtures of such polyether polyols having an average hydroxyl functionality of 2 to 3 and
   (2) an organic compound having a molecular weight below 500 and a functionality in isocyanate addition reactions of 2 to 3.

4. The process of claim 2 wherein component (b) comprises a mixture of
   (1) a polyether polyol having a molecular weight of 500 to 10,000 and a hydroxyl functionality of 2 or 3 or mixtures of such polyether polyols having an average hydroxyl functionality of 2 to 3 and
   (2) an organic compound having a molecular weight below 500 and a functionality in isocyanate addition reactions of 2 to 3.

5. The process of claim 3 wherein component (b2) comprises a di- or tri-alkanolamine, and up to about 70% by weight, based on the total weight of component (b2), of a difunctional and/or trifunctional alkane diol and/or triol having a molecular weight of below 500 and optionally containing ether bridges, component (b2) being present in a quantity of about 3 to 50 parts by weight per 100 parts by weight of component (b1).

6. The process of claim 4 wherein component (b2) comprises a di- or tri-alkanolamine, and up to about 70% by weight, based on the total weight of component (b2), of a difunctional and/or trifunctional alkane diol and/or triol having a molecular weight of below 500 and optionally containing ether bridges, component (b2) being present in a quantity of about 3 to 50 parts by weight per 100 parts by weight of component (b1).

7. The process of claim 1 wherein component (c) comprises an organic tin and/or lead compound.

8. The process of claim 1 wherein component (c) comprises dimethyl tin dilaurate or lead octoate.

9. A light-resistant, optionally foamed elastomeric molded polyurethane which is prepared by a process which comprises reacting
   (a) an organic polyisocyanate component comprising
      (1) a mixture of (i) 1-isocyanato-3,3,5-trimethyl-5-isocyanatomethyl-cyclohexane (IPDI) and
(ii) a polyisocyanate containing isocyanurate groups and at most 0.5% by weight of unreacted diisocyanate, having an isocyanate content of about 15 to 25% by weight and prepared by the trimerization of a portion of the isocyanate groups of 1,6-diisocyanatohexane in proportions by weight of (i):(ii) of about 0.1:1 to 2.5:1 or
(2) a mixture comprising
(i) IPDI and
(iii) a polyisocyanate containing isocyanurate groups and at most 0.5% by weight of unreacted diisocyanate, having an isocyanate content of about 14 to 24% by weight and prepared by the trimerization of a portion of the isocyanate groups of a mixture of 1,6-diisocyanatohexane and IPDI in which the weight ratio of IPDI to HDI is up to 4:1, the quantity of component (i) being calculated so that the mixture (a2) contains from 10 to 70% by weight of IPDI, including any IPDI still present in component (iii) with
(b) an organic compound which contains isocyanate reactive hydrogen atoms and is at least difunctional in isocyanate addition reactions in the presence of
(c) a catalyst which accelerates the isocyanate addition reaction, the reactants being reacted together inside a closed mold in proportions which are suitable to provide an isocyanate index of about 70 to 130.

10. The polyurethane of claim 9 wherein mixture (a1) is present and has an IPDI content of about 35 to 65% by weight, based on the total weight of component (a).

11. The polyurethane of claim 9 wherein component (b) comprises a mixture of
(1) a polyether polyol having a molecular weight of 500 to 10,000 and a hydroxyl functionality of 2 or 3 or mixtures of such polyether polyols having an average hydroxyl functionality of 2 to 3 and
(2) an organic compound having a molecular weight below 500 and a functionality in isocyanate addition reactions of 2 to 3.

12. The polyurethane of claim 10 wherein component (b) comprises a mixture of
(1) a polyether polyol having a molecular weight of 500 to 10,000 and a hydroxyl functionality of 2 or 3 or mixtures of such polyether polyols having an average hydroxyl functionality of 2 to 3 and
(2) an organic compound having a molecular weight below 500 and a functionality in isocyanate addition reactions of 2 to 3.

13. The polyurethane of claim 11 wherein component (b2) comprises a di- or tri-alkanolamine, and up to about 70% by weight, based on the total weight of component (b2), of a difunctional and/or trifunctional alkane diol and/or triol having a molecular weight of below 500 and optionally containing ether bridges, component (b2) being present in a quantity of about 3 to 50 parts by weight per 100 parts by weight of component (b1).

14. The polyurethane of claim 12 wherein component (b2) comprises a di- or tri-alkanolamine, and up to about 70% by weight, based on the total weight of component (b2), of a difunctional and/or trifunctional alkane diol and/or triol having a molecular weight of below 500 and optionally containing ether bridges, component (b2) being present in a quantity of about 3 to 50 parts by weight per 100 parts by weight of component (b1).

15. The polyurethane of claim 9 wherein component (c) comprises an organic tin and/or lead compound.

16. The polyurethane of claim 9 wherein component (c) comprises dimethyl tin dilaurate or lead octoate.

* * * * *